Patented Mar. 7, 1944

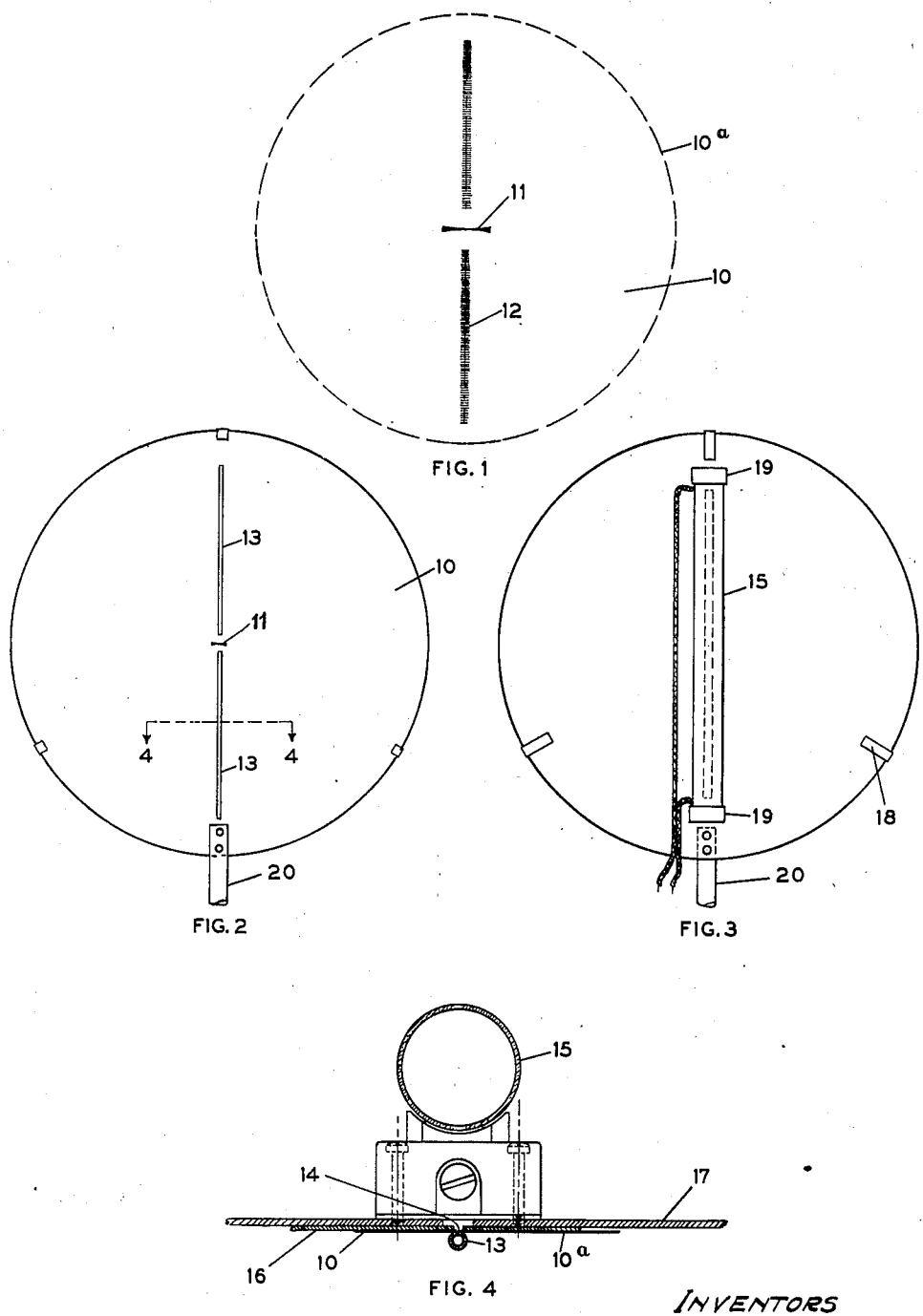

2,343,783

UNITED STATES PATENT OFFICE 2,343,783

APPARATUS FOR SUBJECTIVE REFRACTION OF THE EYES

Matthew Luckiesh, Shaker Heights, and Frank K. Moss, Cleveland, Ohio

Application March 31, 1941, Serial No. 386,102

1 Claim. (Cl. 88—20)

This invention relates to an apparatus for subjective refraction of the eyes and in certain aspects is an improvement on the subject matter of our Patent No. 2,171,881.

The principal object of the invention is to provide an apparatus for causing the eyes to converge upon any desired point in the field of view and for maintaining convergence at such a point throughout the procedures of subjective refraction.

Still further the invention aims to provide an adequate stimulus for convergence (hereinafter designated as the convergence target) which, in itself, does not serve as a stimulus for relative accommodation. Such a target of appropriate size in association with a suitable test object may be placed at any distance from the eyes, thus permitting the ocular refraction to be conducted under so-called static or dynamic conditions.

The above and other objects which will appear from the following description of the apparatus and the technique associated with it are attained by the present invention which, fundamentally, involves the binocular stimulation of convergence in the proved absence of any adequate stimulus for relative accommodation. This apparatus consists essentially of a convergence target and a test object which are located centrally in a suitably illuminated field. The convergence target consists of a bright band of light, obtained either by reflection or transmission, of sufficient size and indistinctness located at the distance at which the eyes are to be examined. The convergence target is preferably so constructed that it is brightest along its central axis and also so that its brightness diminishes laterally from its axis to its outer edges. Ideally, the brightness difference between the convergence target and its surrounding visual field should vary gradually from a maximum at its central axis to zero at its outer edges. It is to be noted that such a convergence target does not present well defined borders which would serve as stimuli for relative accommodation. The avoidance of this accommodative function is an inherent and clinically proved characteristic of our invention. Furthermore, it is an essential one in any determination of the true refractive state of the human eye and various procedures have been used to attain it. For example, cycloplegics, such as atropine, are often used for the purpose of preventing relative accommodation.

The avoidance of relative accommodation by blurring the details of the convergence target is made even more certain when such a target is viewed through the absorbing and/or diffusing filters of the ophthalmic sensitometer disclosed in the before mentioned Patent No. 2,171,881. These filters, when properly adjusted, obscure all details of the visual field except the convergence target, and since the latter does not stimulate relative accommodation, this function is avoided in our method of subjective refraction. Thus the combination of the sensitometric apparatus and the visual field comprising the convergence target and a suitable test object provides a means for converging the eyes at a given point without a concomitantly providing a stimulus for relative accommodation. Hence the amount of accommodation in force during the sensitometric examination of the refractive states of the eyes, either at distance or at near, is that associated or reflexly linked with convergence. In cases involving ocular abnormalities, the accommodation in force may be either excessive or insufficient. In either event, the refractive error is measured without the possibility of distortion due to the exercise of relative accommodation which is an ever-present possibility in the usual methods of subjective refraction. It is emphasized, however, that the interference of relative accommodation is avoided in our procedures due to the fact that the uniquely designed convergence target is viewed under special visual conditions such as those attained, for example, with the ophthalmic sensitometer of our patent.

The control of convergence in the so-called sensitometric method of refraction is further insured by the provision of suitable means for varying independently the brightness and hence the intensity of the stimulus for convergence. Furthermore, the effectiveness of the convergence target is augmented by locating the single test object, such as that disclosed in patent No. 2,171,881, within a small central gap in the streak of light or brightness comprising the convergence target. Thus the target not only provides a powerful stimulus for convergence but also it clearly reveals the exact region of the visual field in which the test object will be seen when the density of the filters, due to their absorbing or diffusing characteristics, before the eyes is altered sufficiently to permit the threshold recognition of the test object.

The detailed procedures of determining the refractive error of either eye in a given meridian through the use of the convergence target, the test object, and the ophthalmic sensitometer are as follows:

The relation between visibility and refraction, in the absence of relative accommodation, is determinable with the sensitometer of the before mentioned patent when the latter is used under certain prescribed conditions. Since this instrument and technique have been described in the patent and in "Archives of Ophthalmology," May 1940, vol. 23, pp. 941–956, only a brief discussion is included here. The sensitometer comprises two gradient filters, precise in optical density and diffusion or in diffusion alone, which may be moved synchronously before the eyes of the subject in order to bring a standardized test object to the threshold of visibility. These gradient filters not only alter the apparent brightness of the entire visual field by absorption but also alter the brightness contrasts of all objects within the visual field due to the diffusing character of the filters. Thus threshold conditions are obtained by photometric changes, while the visibility of the test object may be expressed in terms of any one of the fundamental variables of the threshold stimulus. With the sensitometer, visibility values (preferably expressed in terms of the size of threshold object) are read from a calibrated scale attached to the gradient filters. The method of calibrating this scale and its visual significance have been discussed, see "The Science of Seeing" by Matthew Luckiesh and Frank K. Moss, Chapter V, D. Van Nostrand Co., New York, 1937, and "Journal of the Optical Society of America," volume 30, 1940, page 62 at seq.

It has been shown that relative accommodation is preventable through the avoidance of an adequate stimulus for this function. If, in the measurement of visibility, the test object is brought from a sub-threshold condition to the threshold of visibility by progressively decreasing the density (diffusion or absorption or both) of the filters through which it is viewed, it follows that there can be no optical stimulus for accommodation until the lowest threshold of visibility, involving the mere recognition of the presence of the test object, is reached. The conditions thus imposed by this procedure are somewhat analogous to those involved in the "fogging" method of refraction except that in our procedures all objects within the entire binocular field (with the exception of an adequately diffuse or vaguely defined convergence target) are obscured by the filters until the threshold of test object visibility is reached. Since the visibility of the test object itself is higher than that of other details of the visual field, there is no adequate stimulus for accommodation throughout the process of measurement. Obviously, if the refractive states of the eyes are to be determined at finite distances, it is essential to provide a binocular stimulus for convergence which per se will not stimulate relative accommodation.

The determination of the relationship between visibility and refraction is made possible by the addition of a convergence target consisting of a vaguely defined band of diffused light preferably located in the plane of the test object. It has been shown empirically that such a band of light (whose image lies in parafoveal regions) provides an adequate stimulus for convergence but an inadequate one for relative accommodation. Hence trial lenses of various powers, such as shown and described in our Patent No. 2,171,881, may be placed before either eye alone or before both eyes simultaneously without altering the inherent interlocking relationship between accommodation and convergence. Thus convergence is the controlled factor in the physiologic situation established by these procedures while the excess or deficiency of the refraction is the measured quantity.

The essential steps in the sensitometric examination are as follows, assuming that our improved visual field unit is employed with the sensitometer:

1. A convex cylindrical lens of adequate power is placed before one eye with its axis horizontal. The purpose of this lens is to obliterate the image of the horizontal test object without impairing the image of the vertical convergence target and thus to confine the refraction to the other eye.

2. Spherical or cylindrical lenses of various positive or negative powers are successively placed before the eye under examination and several measurements of the visibility of the test object are made in accordance with the procedure outlined in Patent No. 2,171,881.

3. The visibilities obtained with the various trial lenses are plotted and straight lines are drawn through these points. The resultant graph should be symmetrical about the axis of maximal visibility—an indication of the avoidance of accommodation. Its apex indicates the refraction which will produce maximal visibility without the exercise of either positive or negative relative accommodation.

The above and other features of novelty constitute the present invention which may be further briefly summarized as consisting in certain novel features of construction and arrangement of the so-called sensitometric apparatus.

In the accompanying sheet of drawing wherein we have shown an embodiment of the invention which in clinical practice have proved to be very effective, Fig. 1 is a diagrammatic front view of our improved visual field unit;

Fig. 2 is a front view of the unit as it is preferably constructed;

Fig. 3 is a rear view of the same; and

Fig. 4 is a fragmentary cross-sectional view substantially along the line 4—4 of Fig. 2.

In this instance the unit includes a white field in the form of a circular disk 10 which will be located at the distance from the ophthalmic sensitometer or equivalent apparatus with which it is employed at which the refractive states of the eyes are to be determined and preferably amid dark surroundings. If the unit is utilized with the sensitometer shown and described in our patent above referred to, it will be uniformly illuminated (for near vision tests) by a series of lamps carried by the visibility meter of the sensitometer. However, the field may be so illuminated that it is brightest at the center with the brightness diminishing toward the periphery 10a of the field 10. This can be readily accomplished by substituting for the series of lamps shown in the patent one or more lamps whose light is directed toward the center of the field.

At the center of the disk 10 is located a test object 11 which preferably consists of a biconcave bar such as shown in our Patent No. 2,171,881 and which is preferably of the proportions and size described therein. For the best results it is produced photographically on the white background of the field or disk 10 and is located at the center of this field.

The principal feature of the present invention resides in the provision of a convergence target which in effect consists of a band of diffused light indicated diagrammatically at 12 in Fig. 1 which band is in two aligned sections on opposite sides of the test object and at right angles to its major axis. In other words, the test object is in a centrally arranged gap between the two sections of the band. This convergence target, consisting of the band 12 of diffused light with vague borders, may be formed in different ways. An arrangement which has proved to be very satisfactory consists in placing frosted glass tubes 13 (see particularly Fig. 2) over narrow slits 14 in the white field 10 and illuminating these tubes through the slits 14 preferably by means of a tubular lamp 15 supported at the rear of the field 10 directly behind and in parallel relation with the slits 14 and the tubes 13.

Although the visual field unit may be formed in various ways, in this instance the visual field proper consists of a disk 10a of white paper provided with the test object 11 as before stated, and the slits 14 are formed in this disk of paper. The paper is glued or cemented to a metal disk 16 to which are secured the frosted tubes 13 with the latter bearing against the paper disk 10a directly over the slits 14. The composite disk consisting of the disk of paper 10a and the metal disk 16 is secured in any suitable manner to a rear metal disk 17, in this instance by a series of clips 18. The lamp 15 is supported on the rear disk 17 by having its ends fitted into sockets 19 which are secured the proper distance apart to the disk 17, the length of the lamp being somewhat greater than the length of both of the slits 14 or both of the tubes 13 including the gap at the center. The rear disk 17 is supported on a suitable standard 20 which may have provision for adjusting the visual field unit vertically and will be mounted on a part capable of being moved horizontally to and from the visibility meter or apparatus equivalent thereto. As previously stated, the brightness difference of the convergence target and its surrounding field should vary gradually from its maximum at its central axis to zero at its outer edges. This result is obtained by the arrangement herein illustrated using outside frosted tubes 13. Furthermore, the brightnes and hence the intensity of the stimulus for convergence can be varied by a rheostatic control of the current flowing through the filament extending the length of the tubular lamp 15. The details of the tubular lamp 15 are immaterial but in practice a standard 40 watt inside white coated lamp is employed.

Although obviously the proportions of various parts of the visual field unit may be varied, we might say that very good results have been obtained by using a visual field 14 inches in diameter with a test object 60 minutes in length with the slits 14 1 millimeter in width and 4¾ inches in length, the tubes 13 being somewhat longer than the slits 14 so as to extend slightly beyond the ends of the latter. The metal disks 16 and 17 have slits which are coextensive with the narrow slits 14 in the paper 10a but are somewhat wider than the slit 14. As illustrated in Fig. 4, the slit in the metal disk 16 is about $\frac{1}{16}$ inch in width and the slit in the rear metal disk 17 is about ¼ inch in width. However, these proportions may be varied as found desirable.

The apparatus as illustrated is for the purpose of determining the spherical component of the ophthalmic prescription. For this purpose a horizontal test object and a vertical convergence target are desirable. However, we also determine the astigmatic component of the ophthalmic prescription by our technique. For such purpose it may be desirable to alter the meridianal positions of the test object and the convergence target, as, for example, in any meridian between the vertical and the horizontal with the vertical and the horizontal included. This can be readily done by supporting the visual field unit in a manner such that it can be rotated to bring the test object and the convergence target in any desired meridianal positions.

While we have shown a highly satisfactory form of apparatus and one which is now being used in actual clinical practice, we do not desire to be confined to the precise details of the equipment illustrated herein but aim in our claims to cover all modifications which do not involve a departure from the spirit and the scope of the invention in its broadest aspects.

Having thus described our invention, we claim:

In apparatus for subjective refraction of the eyes, a visual field unit comprising a member having a visual field provided with a central elongated test object, slits formed in said field on opposite sides of the test object, translucent media covering said slits, and means behind the visual field for illuminating said media to produce on opposite sides of the test object a band of brightness having gradually diminishing brightness from its axis to its outer edges.

MATTHEW LUCKIESH.
FRANK K. MOSS.